United States Patent
Galbraith et al.

(10) Patent No.: US 10,901,850 B2
(45) Date of Patent: Jan. 26, 2021

(54) THREAD CHECKPOINT TABLE FOR COMPUTER PROCESSOR

(71) Applicant: INTERNATIONAL BUSINESS MACHINES CORPORATION, Armonk, NY (US)

(72) Inventors: Robert E. Galbraith, Rochester, MN (US); Dylan R. Gransee, Kasson, MN (US); Ethan J. Johnson, Rochester, MN (US); Austin J. Mackedanz, Rochester, MN (US); Mussie T. Negussie, Sacramento, CA (US); Shannon C. Strutz, Rochester, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 178 days.

(21) Appl. No.: 16/253,498

(22) Filed: Jan. 22, 2019

(65) Prior Publication Data

US 2020/0233475 A1 Jul. 23, 2020

(51) Int. Cl.
G06F 11/14 (2006.01)
G06F 11/07 (2006.01)
G06F 1/30 (2006.01)

(52) U.S. Cl.
CPC ...... G06F 11/1407 (2013.01); G06F 11/0721 (2013.01); G06F 1/30 (2013.01)

(58) Field of Classification Search
CPC .... G06F 1/30; G06F 11/0721; G06F 11/0724; G06F 11/1405; G06F 11/1407

USPC .................................................. 714/14, 22
See application file for complete search history.

(56) References Cited

U.S. PATENT DOCUMENTS

| 5,551,043 A | 8/1996 | Crump et al. |
| 9,047,178 B2 | 6/2015 | Talagala et al. |
| 9,361,044 B2 | 6/2016 | Chiu et al. |
| 2014/0237172 A1* | 8/2014 | Shah ................. G06F 9/466 711/103 |

OTHER PUBLICATIONS

Anonymously; "Method and System for Using Power Consumption as an Early Indicator of Problems in Computing Systems," ip.com: Jun. 8, 2010. pp. 3.

(Continued)

*Primary Examiner* — Joseph R Kudirka
(74) *Attorney, Agent, or Firm* — Cantor Colburn LLP; Bryan Bortnick

(57) ABSTRACT

Examples of techniques for a thread checkpoint table for a computer processor are described herein. An aspect includes, based on detecting an early power-off warning (EPOW) signal, determine, based on a thread checkpoint table, whether a status of a thread of a processor indicates that the thread has begun a unit of atomic work. Another aspect includes, based on determining that the status of the thread of the processor indicates that the thread has begun the unit of atomic work, allowing the thread to continue execution of the unit of atomic work. Another aspect includes determining, based the status of the thread in the thread checkpoint table, that the thread has completed the unit of atomic work. Another aspect includes, based on determining that the thread has completed the unit of atomic work, suspending the thread.

20 Claims, 7 Drawing Sheets

(56) References Cited

OTHER PUBLICATIONS

Anonymously; "Methods for Application Checkpointing Using Application Dependence Analysis," ip.com: Oct. 16, 2012. pp. 3.
IBM; "Persistent Checkpoint Display System for a Blade Server," ip.com: Jun. 11, 2008. pp. 3.
Ni, X. et al, "Hiding Checkpoint Overhead in HPC Applications with a Semi-Blocking Algorithm." Google, 2017. pp. 9.
Vassey, E. et al., "Fault-Tolerance through Message-logging and Checkpointing: Disaster Recovery for CORBA-Based Distributed Bank Servers," Google. Apr. 2006. pp. 42.

* cited by examiner

THREAD CHECKPOINT TABLE FOR COMPUTER PROCESSOR

BACKGROUND

The present techniques relate to processors. More specifically, the techniques relate to a thread checkpoint table for a computer processor.

For electrically powered computer systems, even a brief power interruption may have highly disruptive effects. For example, important data may be lost, and considerable time may be required to bring affected computer systems back online, with potentially major consequences.

High-speed computer systems have the capability to do a significant amount of processing in a matter of milliseconds, enabling some mitigation of the effects of a power interruption during the relatively short period of time that it takes for a power failure to occur, if an early warning is provided. It takes a small but finite amount of time, (e.g., a power supply hold time), for the input power level to decline and the stored energy in the bulk capacitance of the power supply to be exhausted. The earlier a warning of an impending power failure is provided, the more a computer system can accomplish by way of mitigation during any remaining processing time before total power loss.

SUMMARY

According to an embodiment described herein, a system can include a processor to, based on detecting an early power off warning (EPOW) signal, determine, based on a thread checkpoint table, whether a status of a thread of the processor indicates that the thread has begun a unit of atomic work. The processor can also, based on determining that the status of the thread of the processor indicates that the thread has begun the unit of atomic work, allow the thread to continue execution of the unit of atomic work. The processor can also determine, based the status of the thread in the thread checkpoint table, that the thread has completed the unit of atomic work. The processor can also, based on determining that the thread has completed the unit of atomic work, suspend the thread.

According to another embodiment described herein, a method can include, based on detecting an early power off warning (EPOW) signal in a processor, determining, based on a thread checkpoint table, whether a status of a thread of the processor indicates that the thread has begun a unit of atomic work. The method can also include, based on determining that the status of the thread of the processor indicates that the thread has begun the unit of atomic work, allowing the thread to continue execution of the unit of atomic work. The method can also include determining, based the status of the thread in the thread checkpoint table, that the thread has completed the unit of atomic work. The method can also include, based on determining that the thread has completed the unit of atomic work, suspending the thread According to another embodiment described herein, an apparatus can include hardware logic to, based on detecting an early power off warning (EPOW) signal in a processor, determine, based on a thread checkpoint table, whether a status of a thread of the processor indicates that the thread has begun a unit of atomic work. The processor can also, based on determining that the status of the thread of the processor indicates that the thread has begun the unit of atomic work, allow the thread to continue execution of the unit of atomic work. The processor can also determine, based the status of the thread in the thread checkpoint table, that the thread has completed the unit of atomic work. The processor can also, based on determining that the thread has completed the unit of atomic work, suspend the thread.

DETAILED DESCRIPTION

Figure 1:
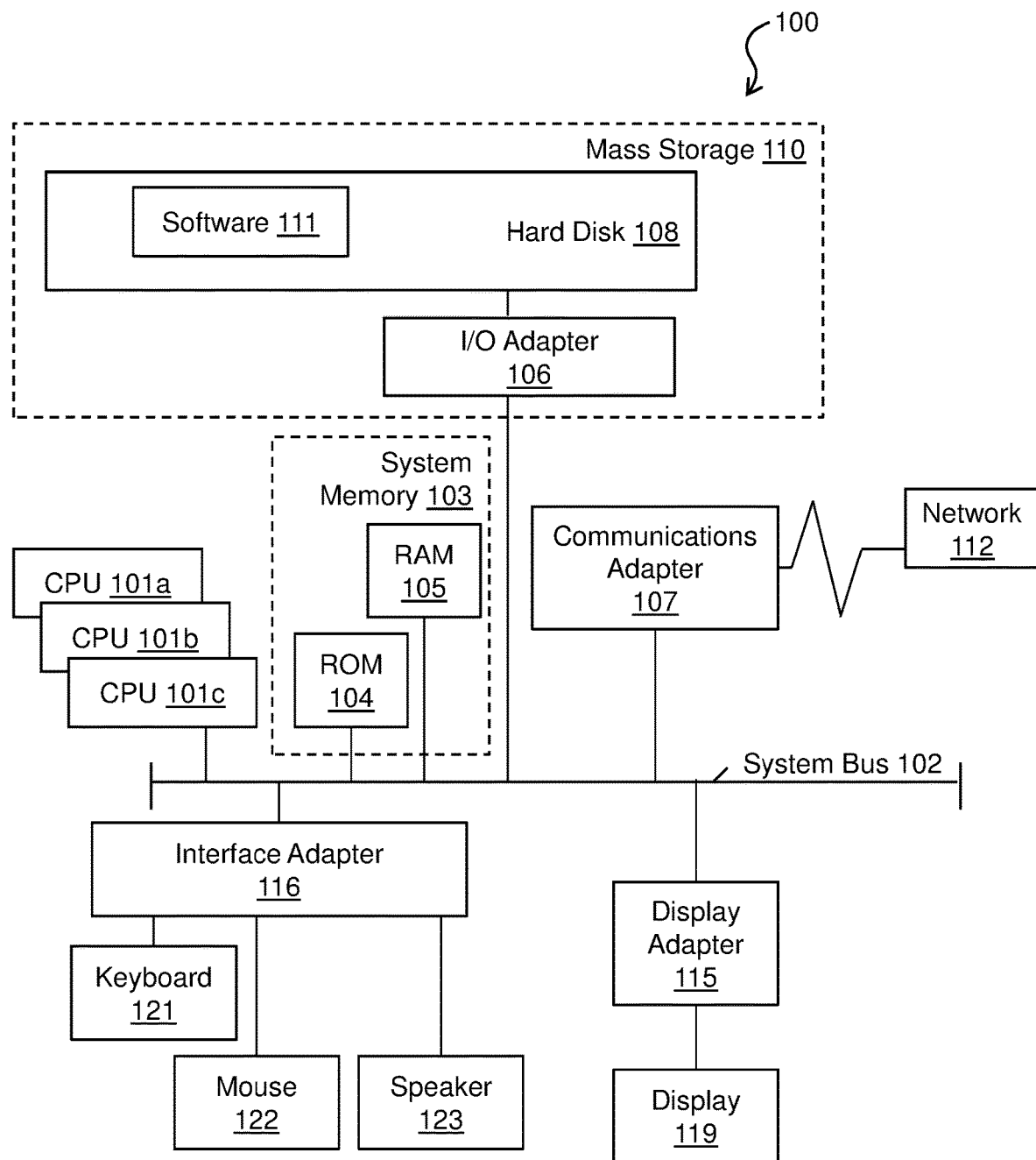
FIG. 1 is a block diagram of an example computer system for use in conjunction with a thread checkpoint table.

Embodiments of a thread checkpoint table for a computer processor are provided, with exemplary embodiments being discussed below in detail. A thread checkpoint table may store data regarding the work being performed by the various threads of a multithreaded computer processor system. The thread checkpoint table may be maintained during execution of software by the processor and stored in a non-volatile memory associated with the processor in response to an impending loss of power. When the power loss situation is resolved, the thread checkpoint table may be used to allow the threads to resume execution.

Storage class memory (SCM) is a type of relatively high performance, high capacity non-volatile memory that may be used in conjunction with a thread checkpoint table. SCM may be used in place of dynamic random access memory (DRAM) as near-processor memory. SCM may have various underlying technologies, including but not limited to phase change memory (PCM), magnetoresistive random access memory (MRAM), and resistive random access memory (RRAM). Because SCM is non-volatile memory, i.e., the contents of SCM are retained after a power off, a processor may recover and continue jobs that were interrupted by the power off after restarting.

In some computer systems (e.g., a laptop), there may be a battery or other backup power source for use in case of a failure of a main power source. In such an environment, loss of main power may not cause a critical response on the hardware level to the processor or memory. However, in an environment in which no battery or other backup power source is present, such as in an embedded processing environment, an early power off warning (EPOW) signal may be asserted a short time before total power loss in the computer system occurs. In some embodiments, a computer system including a backup power source may also implement an EPOW signal when, for example, a backup battery is at a critically low voltage.

In a computer system that includes non-volatile memory such as SCM, a thread checkpoint table that gives a state of programs and memory in the computing system at the time of a total power loss may be used to resume operations by the computer processor after a restart. The thread checkpoint table may track the execution of each thread in the processor, including memory accesses. The checkpoint table may be kept within a local memory in the central processing unit (CPU) until an EPOW is signaled. In response to the EPOW, each thread in the CPU may be suspended at the end of an atomic unit of work using the thread checkpoint table. The checkpoint data in the thread checkpoint table may include any appropriate information regarding a thread, including but not limited to identifiers, pointers, and/or timestamps. The thread checkpoint table may be maintained using instructions that are inserted into computer code by a compiler. The instructions may cause the thread checkpoint table to be updated when an atomic unit of work is begun, and after the atomic unit of work is completed. Checkpoint data is written by the processor into the thread checkpoint table when software that is being executed by the processor executes an instruction, which provides the checkpoint value. In some embodiments, each checkpoint entry may include a status bit (e.g. a most significant bit) that indicates whether an atomic unit of work is currently being performed by the thread. The status bit may be set in the checkpoint table entry to indicate that the thread should be allowed to complete the current atomic unit of work before the thread is suspended in response to an EPOW.

A computer system may be an embedded system on a chip (SOC) that includes a multi-core, multi-threaded CPU with SCM attached. An EPOW signal may be provided to the CPU by a power supply or on-card low voltage detect (LVD). The CPU includes a thread checkpoint table which may contain checkpoint data for each thread of the CPU. The CPU may also include a register that holds a SCM address at which the thread checkpoint table is stored when an EPOW signal is processed. When an EPOW signal is received, power loss control logic of the processor may suspend the execution of each thread in the processor based upon the current status bit of the thread. For example, a "begin" status bit may indicate that an atomic unit of work has been begun by the thread, but not completed. Therefore, a thread with a "begin" status bit may be allowed to continue execution until the status bit of the thread is changed. A status bit of "end" or "simple checkpoint" may indicate that the thread is not in the process of performing an atomic unit of work, so that the thread may be immediately suspended. Entries in the thread checkpoint table may also include timestamps belonging to a thread, or locks that are held by a thread.

In an example of usage of a thread checkpoint table, software that is being executed by a processor thread may need to update multiple control blocks located in the SCM atomically. A "begin" checkpoint may be set for the thread indicating that the thread is beginning an atomic unit of work before the control blocks are updated. When the updating of the control blocks is complete, an "end" checkpoint may be set for the thread. If an EPOW occurs after the "begin" checkpoint is set but before the "end" checkpoint is set, the thread may be allowed to continue execution after the EPOW occurs until the "end" checkpoint is set, in order to complete the atomic unit of work. Upon power up, the thread checkpoint table may be used to verify that each thread completed its atomic unit of work.

In some embodiments, when an EPOW is detected, threads are suspended based on their respective status bits in the thread checkpoint table. Any thread having a status bit indicating "begin" may be permitted to complete its current atomic work unit. After all the threads are suspended, the thread checkpoint table may be flushed to the SCM by the CPU. The thread checkpoint table may be stored at a predetermined address in the SCM. There may also be a full or targeted flush of the processor caches (e.g., level 1, level 2, and/or level 3 caches). In various embodiments, the thread checkpoint table may bypass the processor caches and be flushed directly to the SCM, or the thread checkpoint table may be written to a processor cache before contents of the processor caches are subsequently flushed to the SCM. SCM accesses may be halted on a good error correcting code (ECC) boundary, such that no ECC errors will be encountered when reading the SCM upon power up.

Turning now to FIG. 1, a computer system 100 is generally shown in accordance with an embodiment. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc. (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116 and. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computing system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
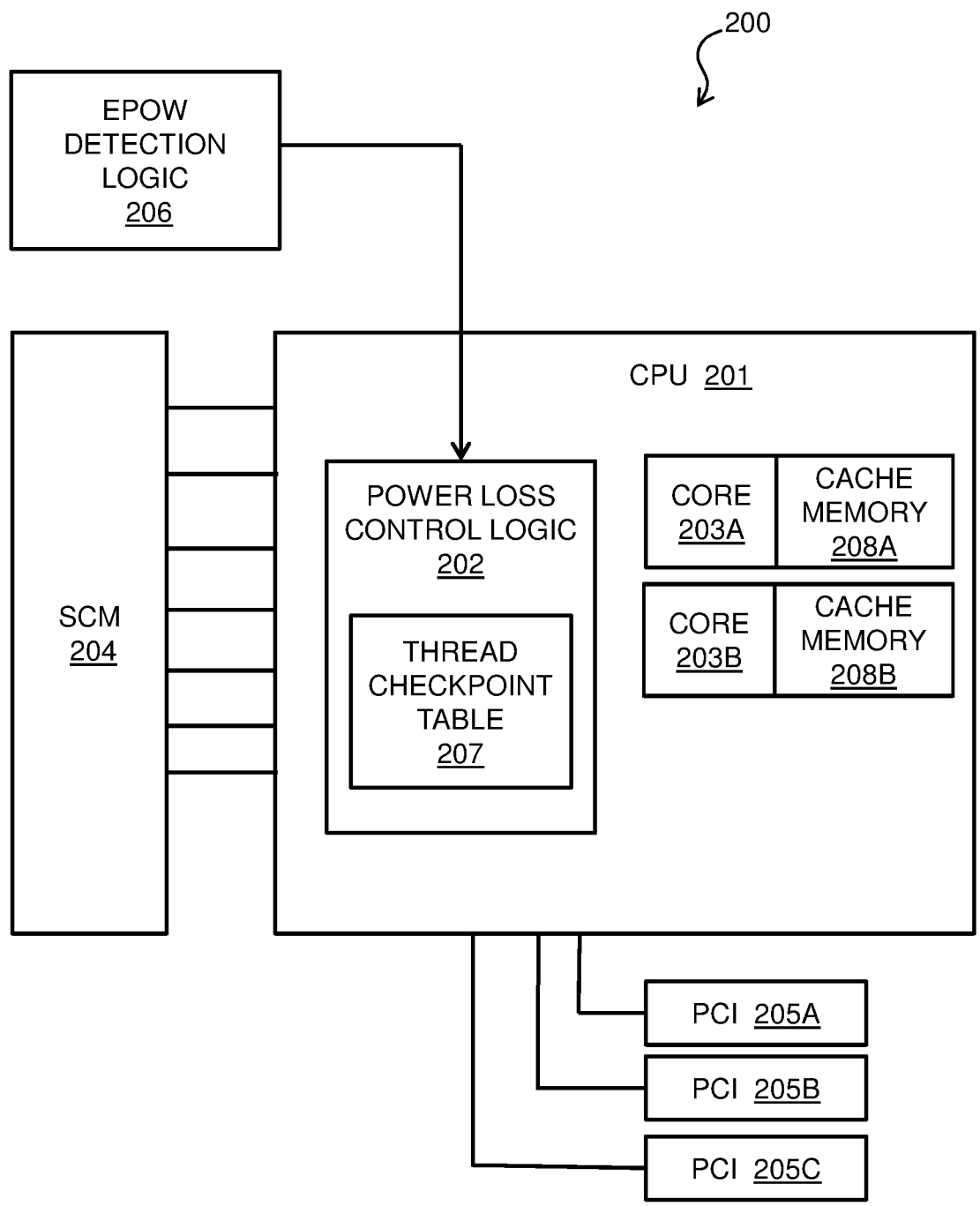
FIG. 2 is a block diagram of an example system including a thread checkpoint table.

FIG. 2 is an example system 200 that may include a thread checkpoint table. System 200 may correspond to a computer system such as computer system 100 of FIG. 1, and CPU 201 in system 200 may correspond to processor(s) 101 of FIG. 1. The CPU 201 includes a plurality of processor cores 203A-B, and a power loss control logic 202. Each processor core 203A-B has a respective cache memory 208A-B, which may include any appropriate number of levels of cache, and may also include one or more registers. The power loss control logic 202 may include a local memory that holds a thread checkpoint table 207. Checkpoint data is inserted by the CPU 201 into the thread checkpoint table 207 in power loss control logic 202 as software (e.g., software 111 of FIG. 1) is executed by the threads of the processor cores 203A-B.

The power loss control logic 202 is in communication with EPOW detection logic 206, which receives an EPOW signal from a power supply of a computer system in which the CPU 201 is located. The CPU 201 is further in communication with a non-volatile memory comprising SCM 204, which may correspond to system memory 103 of FIG. 1. The CPU 201 is also in communication with a plurality of peripheral components via PCIs 205A-C, which may correspond to interface adapter 116 of FIG. 1. System 200 may comprise any appropriate type of computer system; in some embodiments, system 200 may be a SOC.

It is to be understood that the block diagram of FIG. 2 is not intended to indicate that the system 200 is to include all of the components shown in FIG. 2. Rather, the system 200 can include any appropriate fewer or additional components not illustrated in FIG. 2 (e.g., additional processor cores, registers, memory components, etc.). Further, the embodiments described herein with respect to system 200 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 3:
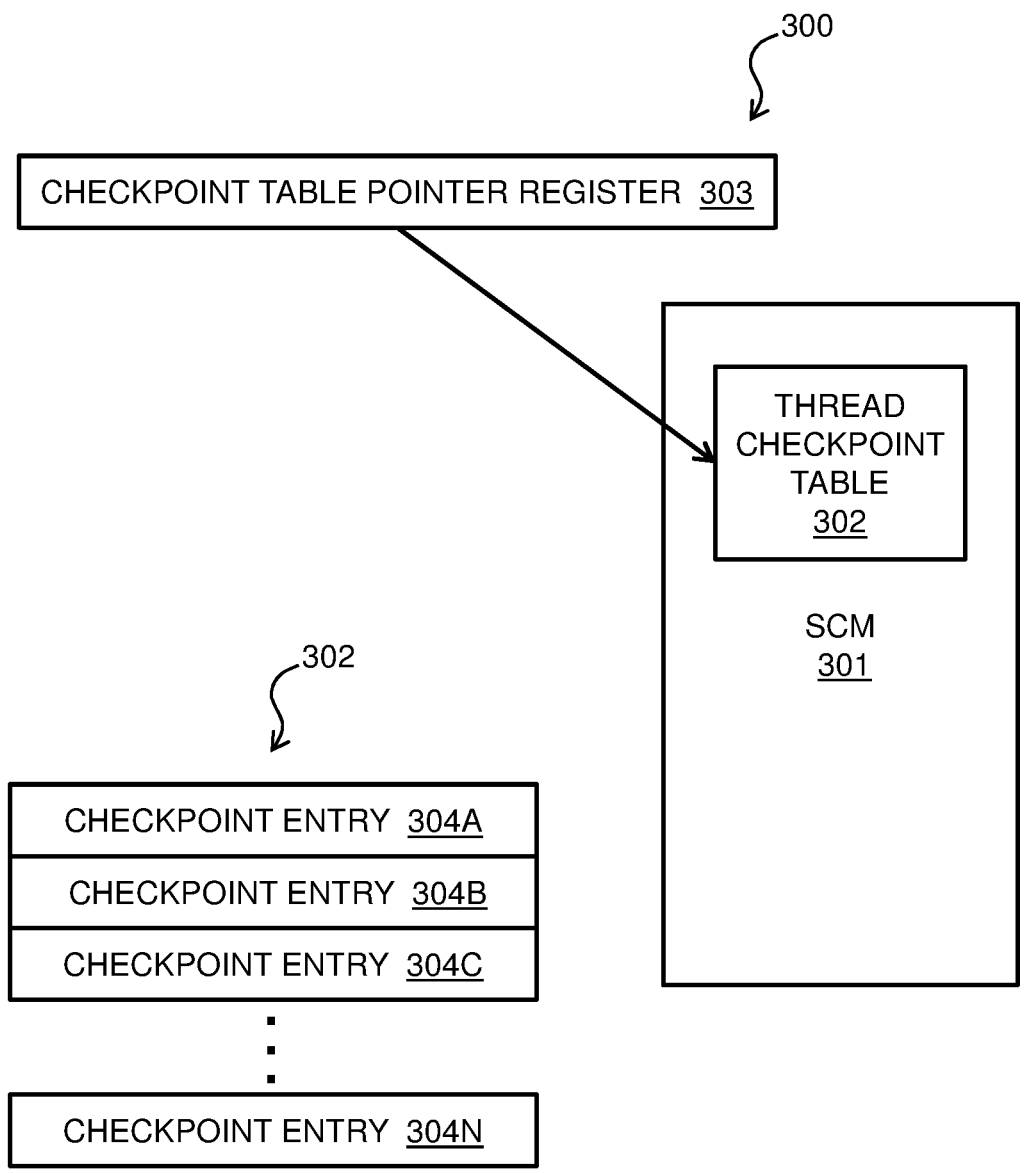
FIG. 3 is a block diagram of an example system for a thread checkpoint table.

FIG. 3 is an example system 300 including a thread checkpoint table. FIG. 3 may be implemented in conjunction with a computer system such as computer system 100 of FIG. 1 and is discussed with respect to system 200 of FIG. 2. System 300 illustrates an embodiment of a thread checkpoint table 302 after power off of the system 200 of FIG. 2. After an EPOW is detected by EPOW detection logic 206 of FIG. 2, but before full power off, the thread checkpoint table 302 is flushed from the power loss control logic 202 to the SCM 301 (which may correspond to SCM 204 of FIG. 2), to a location that is indicated by a memory address in the checkpoint table pointer register 303. The checkpoint table pointer register 303 may be located in CPU 201 of FIG. 2. At restart of the CPU 201, the value that is stored in the checkpoint table pointer register 303 gives the location of the thread checkpoint table 302 in SCM 301, so that the thread checkpoint table 302 may be directly accessed by the CPU 201 upon restart.

The thread checkpoint table 207/302 includes a plurality of entries 304A-N. A thread checkpoint table 207/302 may have any appropriate number of entries. The number of entries 304A-N in the thread checkpoint table 207/302 may correspond to a number of threads that are supported by the CPU 201. The entries 304A-N in thread checkpoint table 207/302 may be indexed based on thread number in some embodiments, such that each thread (e.g., threads A-N) has a respective entry in the thread checkpoint table 207/302. In some embodiments, each of entries 304A-N is the same size as a word size of the CPU 201 that maintains the thread checkpoint table 207/302 (e.g., 32 or 64 bits).

It is to be understood that the block diagram of FIG. 3 is not intended to indicate that the system 300 is to include all of the components shown in FIG. 3. Rather, the system 300 can include any appropriate fewer or additional components not illustrated in FIG. 3 (e.g., additional tables, registers, table entries, memory components, etc.). Further, the embodiments described herein with respect to system 300 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 4:
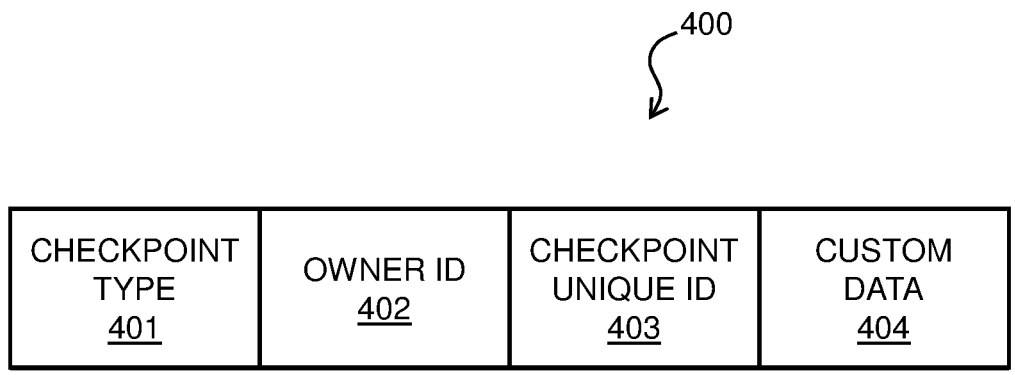
FIG. 4 is a block diagram of an example entry in a thread checkpoint table.

FIG. 4 is a block diagram of an example checkpoint table entry 400. A checkpoint table entry such as checkpoint table entry 400 may correspond to each of checkpoint table entries 304A-N of FIG. 3, and may be located in thread checkpoint table 207/302. Checkpoint table entry 400 includes a checkpoint type field 401. In some embodiments, the checkpoint type field 401 may be a most significant field of the checkpoint table entry 400. In some embodiments, the value of the checkpoint type field 401 may correspond to Begin, indicating that the thread has begun an atomic unit of work; or End, indicating that the thread has completed an atomic unit of work. In some embodiments, the checkpoint type field 401 may be a single bit that tells the processor if there is an atomic work in progress (e.g., '0' corresponds to Begin and '1' corresponds to End). In some embodiments, one or more additional checkpoint types may be indicated by checkpoint type field 401; for example, a checkpoint type field 401 corresponding to a Simple Checkpoint may indicate that the rest of the checkpoint table entry 400 holds general information (e.g., a time stamp or lock information) regarding the corresponding thread. Any appropriate value may be stored in a checkpoint type field 401 to indicate the status of the thread that corresponds to the checkpoint table entry 400, and the checkpoint type field 401 may be any appropriate size.

As shown in FIG. 4, the checkpoint table entry 400 further includes an owner identifier 402, a checkpoint unique identifier 403, and custom data 404. Any appropriate information regarding a thread may be stored in the various fields 402-404 of a checkpoint table entry 400 corresponding to the thread. For example, the owner identifier 402 may hold any appropriate information regarding an owner of the checkpoint table entry 400, including but not limited to a task identifier, a thread identifier, a core number, a state machine name, and/or a real-time transport protocol (RTP) identifier. The checkpoint unique identifier 403 may hold data regarding when the checkpoint entry was updated with respect to other processor events, or data including a checkpoint state transition number, a checkpoint sequence number, or a checkpoint time stamp. Custom data 404 may hold data that enables a process resume after power is restored, for example, a link register, program counter, next instruction address, EPOW restore function pointer, sequence number, and/or address of the last data write.

FIG. 4 is shown for illustrative purposes only; a checkpoint table entry may include any appropriate number of fields, and the fields may hold any appropriate information and have any appropriate size.

Figure 5:
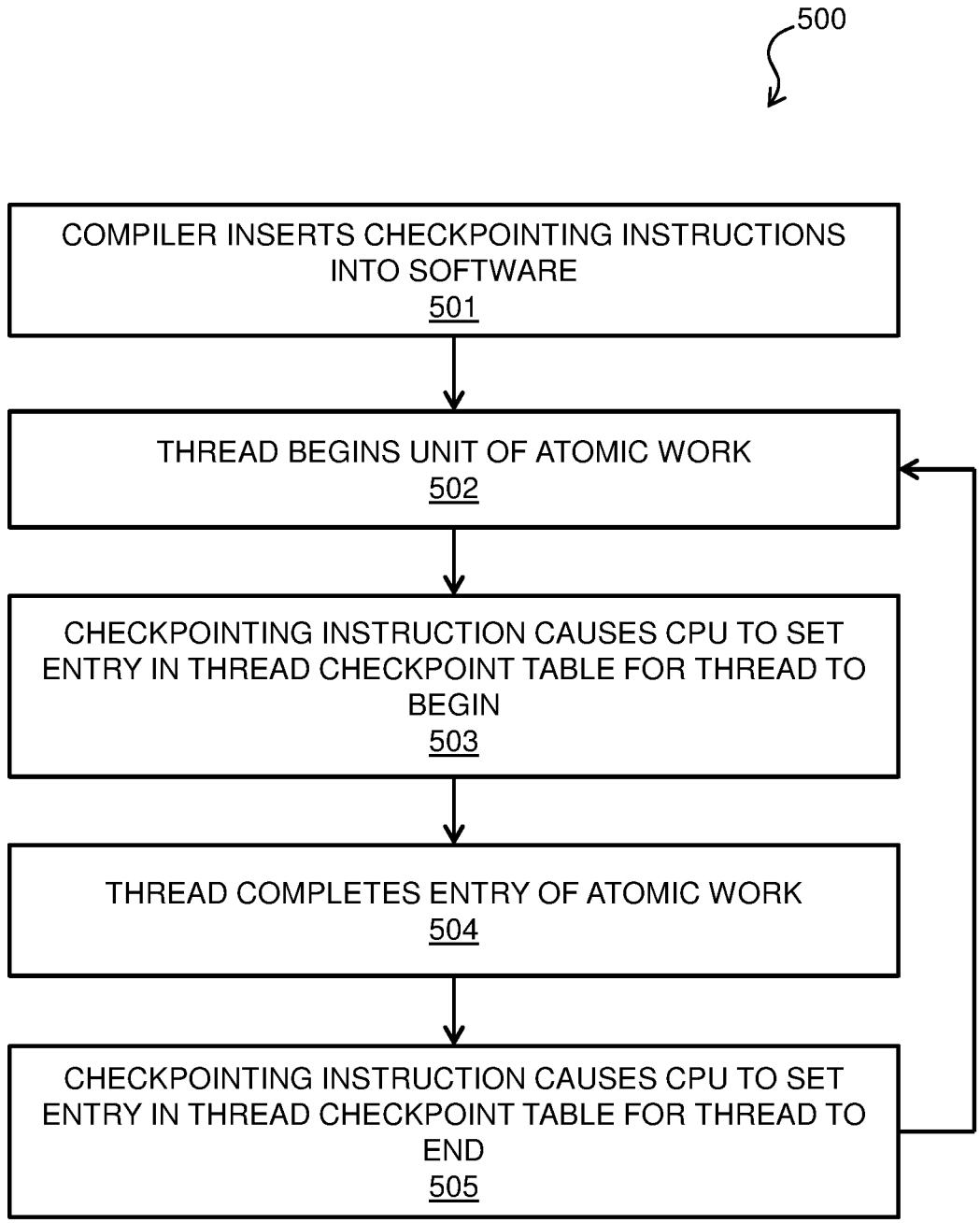
FIG. 5 is a process flow diagram of a method for maintaining a thread checkpoint table.

FIG. 5 is a process flow diagram of an example method 500 for maintaining a thread checkpoint table. The method 500 can be implemented with any suitable computing device, such as the computer system 100 of FIG. 1, and is discussed with respect to FIGS. 2, 3, and 4. In block 501, a compiler inserts checkpointing instructions into software during compiling of software source code into object code. Checkpointing instructions may be inserted before and after atomic units of work in the software (e.g., corresponding to Begin and End checkpoint types), and cause the processor to update the thread checkpoint table during execution of the software. Checkpointing instructions may also cause Simple Checkpoint data to be written into the thread checkpoint table at any appropriate point during the execution of the object code. The object code that is generated by the compiler may then be executed by a processor such as CPU 201 of FIG. 2.

Flow then proceeds to block 502. In block 502, during execution of the object code corresponding to the software by a thread of a processor core 203A, the thread begins a unit of atomic work, such as, for example, updating a memory block. In block 503, based on a checkpointing instruction that was inserted into the code in block 501, a processor core 203A updates the thread checkpoint table entry for the thread (e.g., checkpoint table entry 304A) to indicate that the thread has begun the unit of atomic work. In some embodiments, the checkpoint type field 401 in the checkpoint table entry 304A/400 corresponding to the thread may be updated to indicate Begin in block 503. Other data regarding the unit of atomic work that is being performed by the thread may be written into other fields (e.g. owner identifier 402, a checkpoint unique identifier 403, and custom data 404) in the checkpoint table entry 400 in block 503. The thread checkpoint table 207 that is updated in block 503 may be located in the power loss control logic 202 in some embodiments. In block 504, the thread completes the unit of atomic work that was begun in block 502. In block 505, the processor core 203A updates the checkpoint type field 401 in the checkpoint table entry 304A/400 corresponding to the thread to indicate that the thread has completed the unit of atomic work. In some embodiments, the checkpoint type field 401 in the checkpoint table entry 400 may be updated to indicate End in block 505. Other data regarding the execution of the thread may be written into other fields (e.g. owner identifier 402, a checkpoint unique identifier 403, and custom data 404) in the checkpoint table entry 400 in block 505. The thread checkpoint table 207 that is updated in block 505 may be located in the power loss control logic 202 in some embodiments. Flow then proceeds back to block 502 as the thread continues execution of the software, and when the thread begins another unit of atomic work, the thread checkpoint table entry corresponding to the thread is updated again. Blocks 502-505 of method 500 are repeated throughout the execution of the software; whenever the thread begins or ends a unit of atomic work, the thread's checkpoint table entry is updated. During the execution of block 502-505, Simple Checkpoint data may also be written into any field in a thread's checkpoint table entry 400. At any point during the performing of blocks 502-505 of method 500, an EPOW signal may be received from EPOW detection logic 206 by the power loss control logic 202. Handling of the EPOW signal is discussed in further detail below with respect to FIGS. 6 and 7.

The process flow diagram of FIG. 5 is not intended to indicate that the operations of the method 500 are to be executed in any particular order, or that all of the operations of the method 500 are to be included in every case. Additionally, the method 500 can include any suitable number of additional operations.

Figure 6:
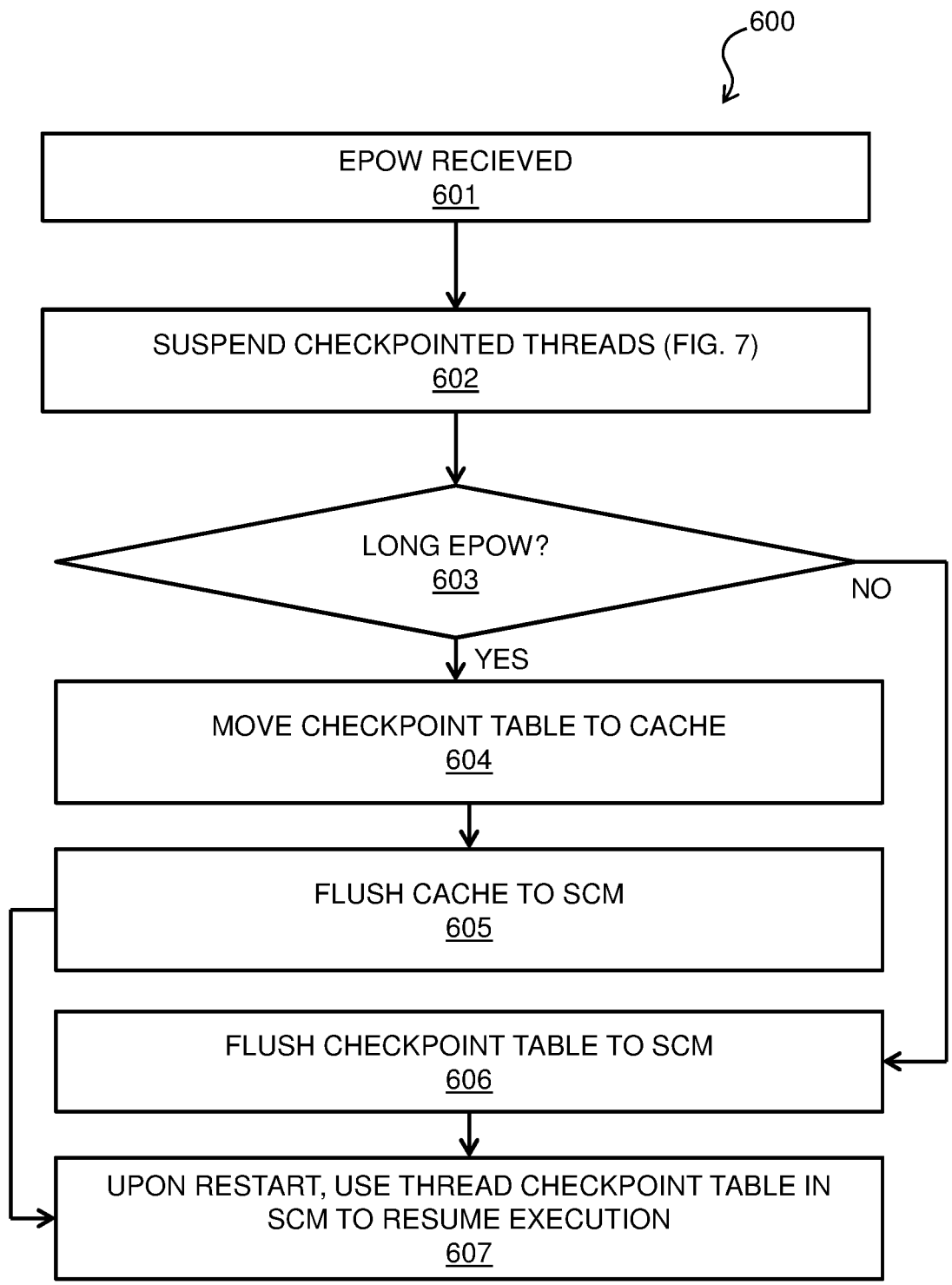
FIG. 6 is a process flow diagram of a method for powering off a processor using a thread checkpoint table.

FIG. 6 is a process flow diagram of an example method 600 for powering off a processor using a thread checkpoint table. The method 600 can be implemented with any suitable computing device, such as the computer system 100 of FIG. 1, and is discussed with respect to FIGS. 2, 3, and 4. Method 600 may occur during the execution of blocks 502-505 of method 500 of FIG. 5; method 600 is triggered whenever an EPOW signal is detected. In block 601, an EPOW signal is detected by EPOW detection logic 206, which triggers the power loss control logic 202. In block 602, the power loss control logic 202 suspends all of the threads of the CPU 201. Suspension of the threads is performed based on the thread checkpoint table 207, and is discussed in further detail below with respect to FIG. 7. In block 603, after all of the threads are suspended, it is determined whether the EPOW that was received in block 601 is a long EPOW. If it is determined in block 603 that the EPOW is a long EPOW, flow proceeds from block 603 to block 604, in which the checkpoint table is moved to a cache (such as cache memory 208A) of the CPU 201. Then, in block 605, the contents of the cache, including the thread checkpoint table 207, are flushed from the cache to the SCM 204/301 (as shown by thread checkpoint table 302 of FIG. 3). The thread checkpoint table may be flushed to a location in the SCM 301 that is given by checkpoint table pointer register 303 in some embodiments.

If it was determined in block 603 that the EPOW is not a long EPOW, flow proceeds from block 603 to block 606. In block 606, the thread checkpoint table is flushed directly to the SCM 204/301 (as shown by thread checkpoint table 302 of FIG. 3). The thread checkpoint table may be flushed to a location that is given by checkpoint table pointer register 303 in some embodiments.

From blocks 605 and 606 of method 600, flow proceeds to block 607. In block 607, power is restored, and the CPU 201 resumes execution based on the information in the thread checkpoint table 302 in the SCM 204/301. The CPU 201 may locate the thread checkpoint table 302 based on the contents of the checkpoint table pointer register 303.

The process flow diagram of FIG. 6 is not intended to indicate that the operations of the method 600 are to be executed in any particular order, or that all of the operations of the method 600 are to be included in every case. Additionally, the method 600 can include any suitable number of additional operations.

Figure 7:
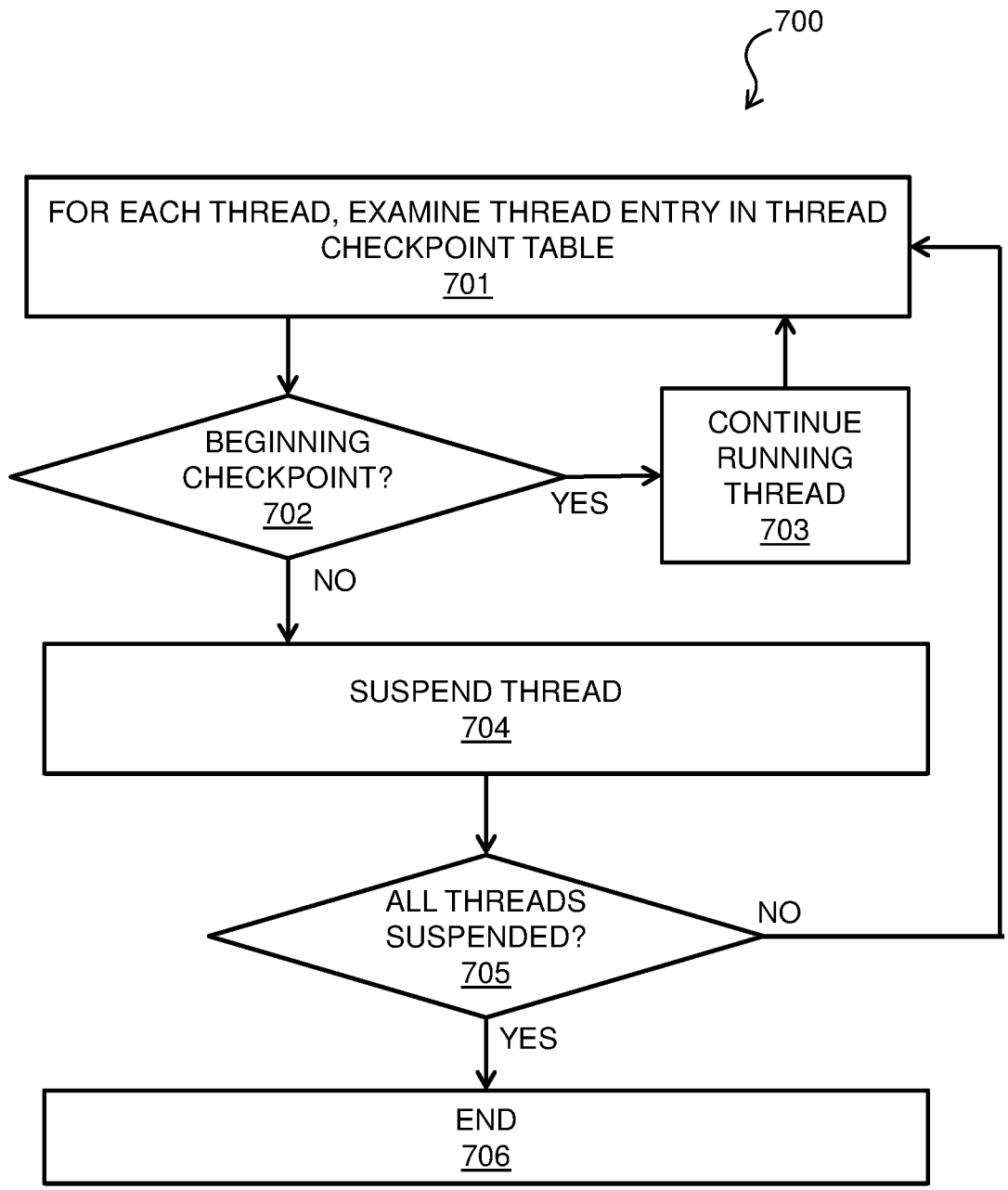
FIG. 7 is a process flow diagram of a method for suspending threads in a processor including a thread checkpoint table.

FIG. 7 is a process flow diagram of an example method 700 for suspending threads using a thread checkpoint table. The method 700 can be implemented with any suitable computing device, such as the computer system 100 of FIG. 1, and is discussed with respect to FIGS. 2, 3, and 4. Method 700 may occur in block 602 of FIG. 6. In block 701, for each thread of the plurality of threads (e.g., threads A-N) of the CPU 201, the checkpoint type field 401 of the thread's respective checkpoint table entry 400/304A-N in the thread checkpoint table 207 in power loss control logic 202 is examined. In block 702, if the checkpoint type field 401 indicates Begin for a thread, flow proceeds to block 703, in which the thread is allowed to continue running according to blocks 502-505 of FIG. 5. Flow then proceeds back to block 701, and the checkpoint type field 401 of the thread's respective checkpoint table entry 400/304A-N in the thread checkpoint table in power loss control logic 202 is examined again.

If it is determined in block 702 that the checkpoint type field 401 for a thread is not Begin (e.g., the checkpoint type field 401 indicates End or Simple Checkpoint), flow proceeds from block 702 to block 704, in which the thread is suspended. Flow then proceeds to block 705, in which it is determined whether all threads of the CPU 201 are suspended. If all threads of the processor are not determined to be suspended in block 705, flow proceeds back to block 701, and blocks 701, 702, 703, and 704 are repeated until all threads are determined to be suspended in block 705. When all threads of the processor are determined to be suspended in block 705, flow proceeds to block 706, and method 700 ends.

The process flow diagram of FIG. 7 is not intended to indicate that the operations of the method 700 are to be executed in any particular order, or that all of the operations of the method 700 are to be included in every case. Additionally, the method 700 can include any suitable number of additional operations.

The present techniques may be a system, a method or an apparatus. The flowchart and block diagrams in the Figures illustrate the architecture, functionality, and operation of possible implementations of systems, methods, and apparatus according to various embodiments of the present techniques. In this regard, each block in the flowchart or block diagrams may represent a module, segment, or portion of logic for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor configured to:
    based on detecting an early power off warning (EPOW) signal, determine, based on a thread checkpoint table, whether a status of a thread of the processor indicates that the thread has begun a unit of atomic work;
    based on determining that the status of the thread of the processor indicates that the thread has begun the unit of atomic work, allow the thread to continue execution of the unit of atomic work;
    determine, based on the status of the thread in the thread checkpoint table, that the thread has completed the unit of atomic work; and
    based on determining that the thread has completed the unit of atomic work, suspend the thread.

2. The system of claim 1, wherein the unit of atomic work comprises updating a memory block.

3. The system of claim 1, wherein the processor is further configured to:
    determine that all threads of the processor have been suspended based on the thread checkpoint table; and
    based on determining that all threads of the processor have been suspended, flush the thread checkpoint table from a local memory in the processor to a non-volatile memory that is in communication with the processor.

4. The system of claim 3, wherein an address of a location to which the thread checkpoint table is flushed in the non-volatile memory is stored in a checkpoint table pointer register of the processor, and wherein the non-volatile memory comprises storage class memory (SCM).

5. The system of claim 4, wherein the processor is further configured to:
based on a restart of the processor after the detection of the EPOW signal:
access the thread checkpoint table at the address in the non-volatile memory based on the checkpoint table pointer register; and
resume execution of the thread based on the thread checkpoint table.

6. The system of claim 1, wherein the status of the thread in the thread checkpoint table is updated to indicate that the thread has begun the unit of atomic work based on a first checkpointing instruction that was inserted by a compiler into object code that is being executed by the thread; and
wherein the status of the thread in the thread checkpoint table is updated after detecting of the EPOW signal to indicate that the thread has completed the unit of atomic work based on a second checkpointing instruction that was inserted by the compiler into the object code.

7. The system of claim 1, wherein the thread checkpoint table comprises a plurality of checkpoint table entries, and wherein each checkpoint table entry corresponds to a single respective thread of the processor.

8. A computer-implemented method, comprising:
based on detecting an early power off warning (EPOW) signal in a processor, determining, based on a thread checkpoint table, whether a status of a thread of the processor indicates that the thread has begun a unit of atomic work;
based on determining that the status of the thread of the processor indicates that the thread has begun the unit of atomic work, allowing the thread to continue execution of the unit of atomic work;
determining, based on the status of the thread in the thread checkpoint table, that the thread has completed the unit of atomic work; and
based on determining that the thread has completed the unit of atomic work, suspending the thread.

9. The computer-implemented method of claim 8, wherein the unit of atomic work comprises updating a memory block.

10. The computer-implemented method of claim 8, further comprising:
determining that all threads of the processor have been suspended based on the thread checkpoint table; and
based on determining that all threads of the processor have been suspended, flushing the thread checkpoint table from a local memory in the processor to a non-volatile memory that is in communication with the processor.

11. The computer-implemented method of claim 10, wherein an address of a location to which the thread checkpoint table is flushed in the non-volatile memory is stored in a checkpoint table pointer register of the processor, and wherein the non-volatile memory comprises storage class memory (SCM).

12. The computer-implemented method of claim 11, further comprising:
based on a restart of the processor after the detection of the EPOW signal:
accessing the thread checkpoint table at the address in the non-volatile memory based on the checkpoint table pointer register; and
resuming execution of the thread based on the thread checkpoint table.

13. The computer-implemented method of claim 8, wherein the status of the thread in the thread checkpoint table is updated to indicate that the thread has begun the unit of atomic work based on a first checkpointing instruction that was inserted by a compiler into object code that is being executed by the thread; and
wherein the status of the thread in the thread checkpoint table is updated after detecting of the EPOW signal to indicate that the thread has completed the unit of atomic work based on a second checkpointing instruction that was inserted by the compiler into the object code.

14. The computer-implemented method of claim 8, wherein the thread checkpoint table comprises a plurality of checkpoint table entries, and wherein each checkpoint table entry corresponds to a single respective thread of the processor.

15. An apparatus, comprising hardware logic configured to:
based on detecting an early power off warning (EPOW) signal in a processor, determine, based on a thread checkpoint table, whether a status of a thread of the processor indicates that the thread has begun a unit of atomic work;
based on determining that the status of the thread of the processor indicates that the thread has begun the unit of atomic work, allow the thread to continue execution of the unit of atomic work;
determine, based on the status of the thread in the thread checkpoint table, that the thread has completed the unit of atomic work; and
based on determining that the thread has completed the unit of atomic work, suspend the thread.

16. The apparatus of claim 15, wherein the unit of atomic work comprises updating a memory block.

17. The apparatus of claim 15, wherein the hardware logic is configured to:
determine that all threads of the processor have been suspended based on the thread checkpoint table; and
based on determining that all threads of the processor have been suspended, flush the thread checkpoint table from a local memory in the processor to a non-volatile memory that is in communication with the processor.

18. The apparatus of claim 17, wherein an address of a location to which the thread checkpoint table is flushed in the non-volatile memory is stored in a checkpoint table pointer register of the processor, and wherein the non-volatile memory comprises storage class memory (SCM).

19. The apparatus of claim 18, wherein the hardware logic is configured to:
based on a restart of the processor after the detection of the EPOW signal:
access the thread checkpoint table at the address in the non-volatile memory based on the checkpoint table pointer register; and
resume execution of the thread based on the thread checkpoint table.

20. The apparatus of claim 15, wherein the status of the thread in the thread checkpoint table is updated to indicate that the thread has begun the unit of atomic work based on a first checkpointing instruction that was inserted by a compiler into object code that is being executed by the thread; and
wherein the status of the thread in the thread checkpoint table is updated after detecting of the EPOW signal to indicate that the thread has completed the unit of atomic work based on a second checkpointing instruction that was inserted by the compiler into the object code.

\* \* \* \* \*